United States Patent
Sasamori et al.

(10) Patent No.: US 7,720,287 B2
(45) Date of Patent: May 18, 2010

(54) IMAGE PROCESSING APPARATUS, IMAGE PROCESSING METHOD, AND COMPUTER READABLE MEDIUM, FOR GENERATING AND EXTRACTING IMAGE INFORMATION

(75) Inventors: Takahide Sasamori, Ebina (JP); Shigeki Muramatsu, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 473 days.

(21) Appl. No.: 11/765,087

(22) Filed: Jun. 19, 2007

(65) Prior Publication Data
US 2008/0085052 A1    Apr. 10, 2008

(30) Foreign Application Priority Data
Oct. 4, 2006   (JP) .............................. 2006-272527

(51) Int. Cl.
G06K 9/46    (2006.01)
G06K 9/00    (2006.01)

(52) U.S. Cl. ....................................... 382/190; 382/181

(58) Field of Classification Search ................. 382/112, 382/160–165, 180–190, 224–225, 236, 309, 382/100; 707/101; 358/530–540, 504; 250/559.01–559.2; 708/530–540; 702/35
See application file for complete search history.

(56) References Cited

U.S. PATENT DOCUMENTS

| 6,043,823 | A  | * | 3/2000 | Kodaira et al. | ............... 345/619 |
| 7,218,783 | B2 | * | 5/2007 | Bargeron et al. | ............ 382/188 |
| 7,503,043 | B2 | * | 3/2009 | Lupini et al. | ................. 717/175 |
| 2003/0237046 | A1 | * | 12/2003 | Parker et al. | ................ 715/513 |
| 2004/0019499 | A1 | * | 1/2004 | Murashita | ...................... 705/1 |

FOREIGN PATENT DOCUMENTS

| JP | 6-270477 A | 9/1994 |
| JP | 09-200513 A | 7/1997 |

* cited by examiner

*Primary Examiner*—Samir A. Ahmed
*Assistant Examiner*—Mehdi Rashidian
(74) *Attorney, Agent, or Firm*—Sughrue Mion, PLLC

(57) ABSTRACT

An image processing apparatus includes: an image reading unit that reads image information; a generating unit that generates new additional information to be added to the image information read by the image reading unit; an extracting unit that extracts, in a case where the image information read by the image reading unit includes existing additional information, the existing additional information; and an additional information processing unit that embeds the existing additional information and the new additional information in the image information.

6 Claims, 5 Drawing Sheets

IMAGE PROCESSING APPARATUS, IMAGE PROCESSING METHOD, AND COMPUTER READABLE MEDIUM, FOR GENERATING AND EXTRACTING IMAGE INFORMATION

CROSS-REFERENCE TO RELATED APPLICATIONS

This application is based on and claims priority under 35 U.S.C. 119 from Japanese Patent Application No. 2006-272527 filed Oct. 4, 2006.

BACKGROUND

1. Technical Field

The present invention relates to an image processing apparatus, an image processing method, a computer readable medium, and a computer data signal.

2. Related Art

In recent years, in the case of performing output processing on an original, for example, outputting the original by a printer, or copying the original by a copier, there has been a fear of the possibility of leakage of secret information.

SUMMARY

According to an aspect of the present invention, An image processing apparatus comprising: an image reading unit that reads image information; a generating unit that generates new additional information to be added to the image information read by the image reading unit; an extracting unit that extracts, in a case where the image information read by the image reading unit includes existing additional information, the existing additional information; and an additional information processing unit that embeds the existing additional information and the new additional information in the image information.

BRIEF DESCRIPTION OF THE DRAWINGS

Exemplary embodiment of the present invention will be described in detail based on the following figures, wherein.

DETAILED DESCRIPTION

Figure 1:
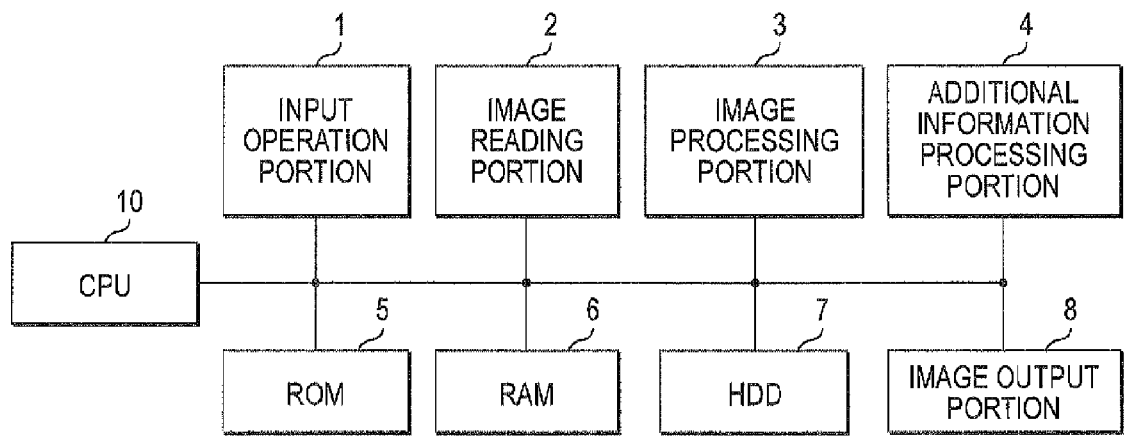
FIG. 1 is a block diagram illustrating an information processing apparatus according to an embodiment of the invention.

Hereinafter, an embodiment of the invention is described with reference to the accompanying drawings. That is, an image processing apparatus according to the present embodiment is constituted mainly by a copier or a multifunction machine (i.e., a machine having a plurality of functions, such as those of a scanner, a printer, and a facsimile). The image processing apparatus includes an input operation portion 1, an image reading portion 2, an image processing portion 3, an additional information processing portion 4, a ROM (Read-Only Memory) 5, a RAM (Random Access Memory) 6, a HDD (Hard Disk Drive) 7, and an image output portion 8.

The input operation portion 1 receives instructions from a user, which relate to various setting of a copying process (e.g., the designation of the number of copies, image quality, a paper size, and scaling) and to user authentication. The input operation portion 1 is, for example, a touch panel display or a card verifier.

The image reading portion 2 reads an image of an original to be copied, and converts the read image into image information (or image data). The image reading portion 2 is, for example, a scanner.

The image processing portion 3 performs various image processing, such as compression, extension, binarization, image quality adjustment, enlargement, and contraction, on image information on the read image of the original. The image processing portion 3 is implemented by a combination of image processing hardware (e.g., an operational circuit) and image processing software.

Figure 2:
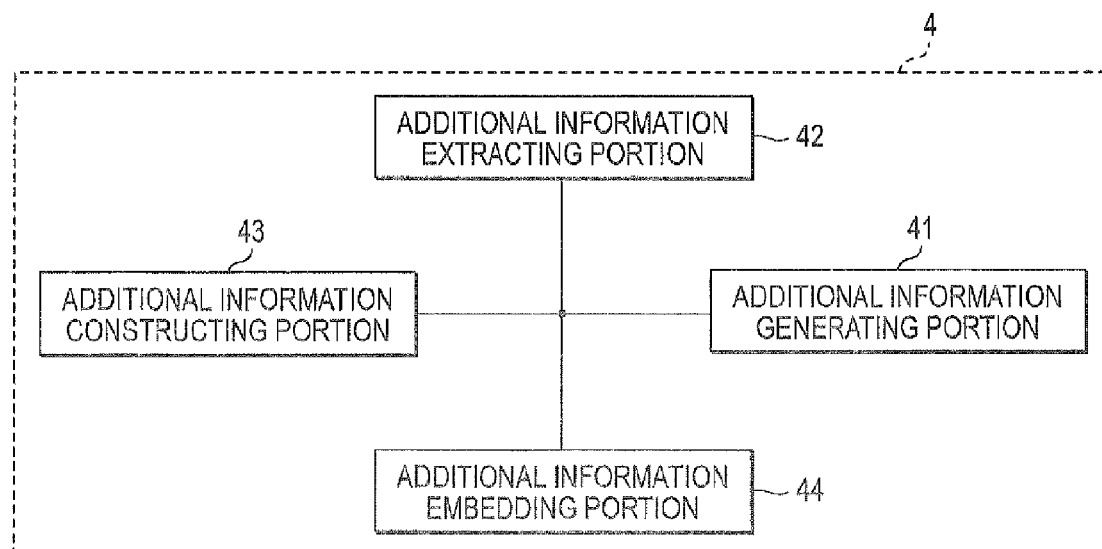
FIG. 2 is a block diagram illustrating the configuration of an additional-information processing portion.

The additional information processing portion 4 performs various processing on additional information corresponding to history information which concerns image processing. The additional information processing portion 4 is implemented mainly by software. FIG. 2 is a block diagram illustrating the configuration of the additional information processing portion 4. That is, the additional information processing portion 4 includes an additional information generating portion 41, an additional information extracting portion 42, an additional information constructing portion 43, and an additional information embedding portion 44.

Among these portions, the additional information processing portion 41 generates new additional information (hereinafter also simply referred to as a "additional information") corresponding to history information on image processing performed on image information representing an image of the original read by the image reading portion 2. The additional information is uniquely determined corresponding to a history of image processing performed on an image of a read original. For example, the additional information is generated by random numbers or by being optionally selected from an additional information table. A piece of history information is constructed corresponding to a copy job. Then, the additional information is registered in the HDD 7 or in an external server in a state in which the additional information is associated with the history information. Accordingly, the history of processing performed on the original can easily be tracked by calling the registered content using the additional information as a key.

The additional information extracting portion 42 extracts existing additional information (hereinafter also simply referred to as a "additional information") already included in the image information of the original read by the image reading portion 2 from the image information. That is, an original to be read is produced by printing a user's original document on a sheet of predetermined paper. However, additional information may already be embedded in the predetermined paper of the original. The additional information extracting portion 42 performs a separation process on the image information representing the image of the read original to separate original information, which represents an original such as a document, from additional information and to extract the already included additional information.

Various processes, for example, a process of performing extraction of the additional information from the image information by performing predetermined pattern matching and a process of performing discrimination of the original information representing, for example, a text from the image by character recognition and of removing the original information are devised as the separation process.

The additional information constructing portion 43 performs a process of linking the additional information already included by the additional information extracting portion 42 and new additional information generated by the additional information generating portion 41, using a predetermined pattern. The pattern used in this linking process will be described later.

The additional information embedding portion 44 embeds the linked additional information, which is constructed by the additional information constructing portion 43, in the image information. Consequently, information obtained by superposing the additional information, which is linked with a predetermined region of the image represented by the image information and includes the already embedded additional information and the newly generated additional information, on the original data is generated. Thus, the generated image information is print-output data or file-output data.

The ROM 5 is a read-only memory that stores basic software performed by the image processing apparatus according to the present embodiment. The RAM 6 is a freely readable and writable memory that temporarily stores software read from the ROM 5 and the HDD 7 and that serves as a temporary storage region to be used when performing processing on the image information representing an image of a read original.

The HDD 7 is a storage means that stores image information read from an original and image information sent from an external apparatus. The HDD 7 serves also as a storage portion that stores history information concerning the image information read from an original and the generated image information, if necessary. An external server can be used as an alternative to the HDD 7. In this case, the image processing apparatus according to the invention is not necessarily provided with the HDD 7. However, preferably, in a case where image processing is performed, the HDD is provided in the apparatus to store the read image information, intermediate data used in the middle of image processing, and the processed information.

The image output portion 8 can serve as a portion that outputs an image based on the image information representing an image of an original read by the image reading portion 2 by printing the image according to an electrophotographic method. Alternatively, the image output portion 8 can serve as a portion that outputs image information to a predetermined folder or to an external computer.

The image processing apparatus having this configuration according to the present embodiment can be constructed in one unit. Alternatively, this image processing apparatus can be constructed so that a part of the composing elements thereof is connected to the rest of the composing elements through a network. That is, the configuration of the image processing apparatus according to the present embodiment is incorporated into an apparatus or system that performs a sequence of operations of reading an image of an original and outputting the read image to paper or as a file. Thus, the image processing apparatus according to the present invention can be implemented by a single unit, such as a copier, which performs these functions, or by a system in which the scanning of an original, image processing, and image output are performed by separate units, respectively.

Figure 3:
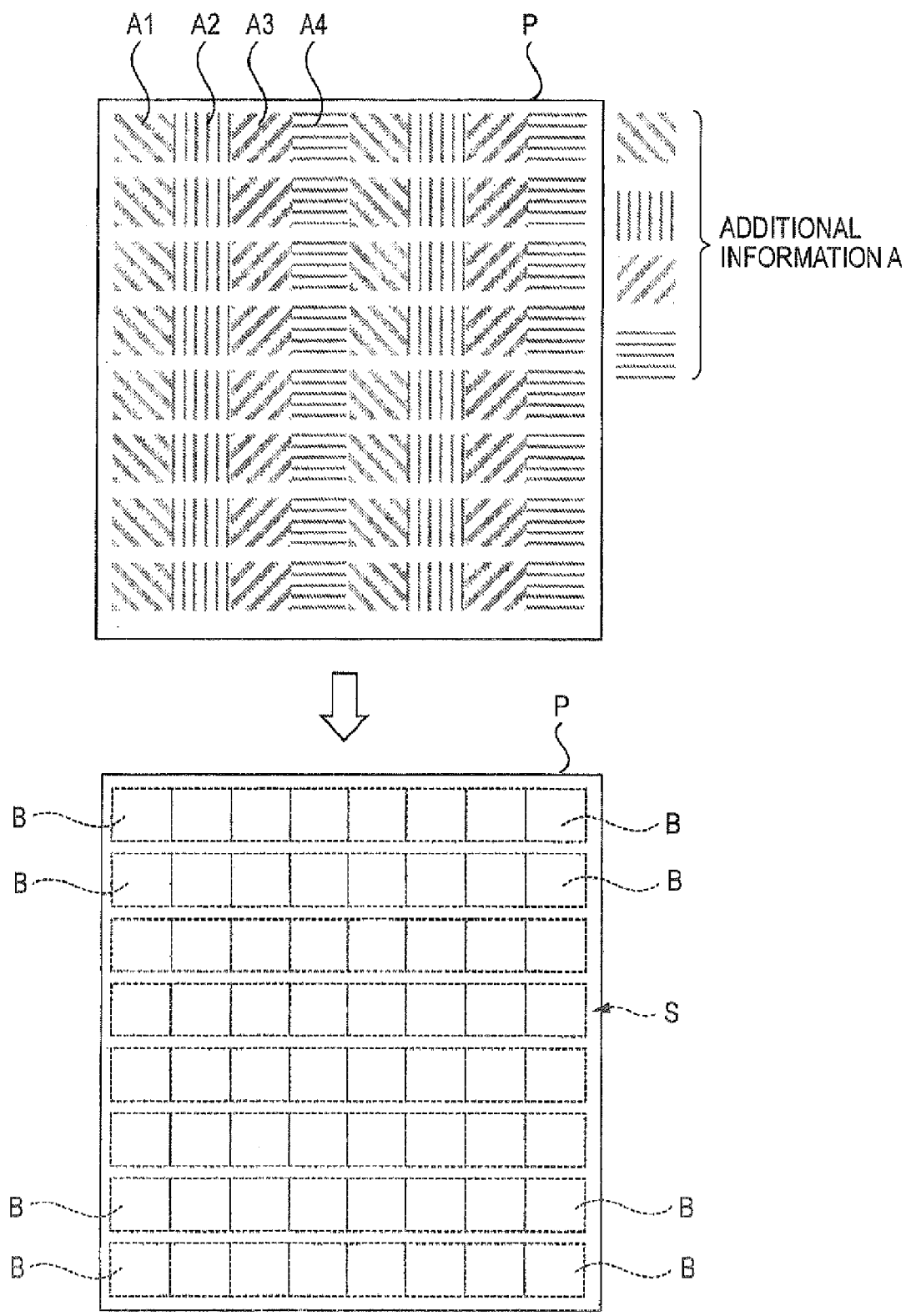
FIG. 3 is a schematic diagram illustrating additional information.

FIG. 3 is a schematic diagram illustrating additional information. That is, additional information $\underline{A}$ is identification information to be embedded in paper P on which a predetermined document is printed. The additional information $\underline{A}$ is uniquely generated as, for example, a barcode, a two-dimensional code, or a mark, using random numbers or a table. The additional information $\underline{A}$ is unemphatically printed separately from the document printed on the paper P. The additional information $\underline{A}$ is sometimes printed on a margin of the paper P. Alternatively, the additional information $\underline{A}$ is printed thereon with a color material of a color that is difficult to visually check and that can be discriminated only by a sensor.

The additional information $\underline{A}$ represents an identification mark associated with history information representing various processes performed on this printed material. A database, in which the additional information $\underline{A}$ is associated with the history information, is registered in the HDD 7 or an external server.

Information concerning a history of a copying process, such as information representing a user ID of a user having copied a printed matter, a time-and-date, at which a copy is made, a document name, the machine number of the apparatus, and an e-mail address of the user having copied the printed matter, more specifically, information enabling the tracking of the history of the process, and information relating to a history of image processing, such as information representing the number of copies, and information representing which of a monochrome image and a color image the copied image is, are registered. Therefore, the additional information $\underline{A}$ embedded in the printed matter is read and recognized by a scanner or the like. Then, registration information (or history information) corresponding to the additional information $\underline{A}$ is read from the HDD 7 or the external server. Thus, information representing the source of a copy of the printed matter can easily be identified. The apparatus can read the history of the process, such as when the printed matter is read, who performs a copying process, what machine is used to perform a copying process, and what copying process is performed, and what copy of the printed matter is output. For example, even when illegal leakage of information due to a copy of a printer matter is performed, the source of the copy can be tracked.

As illustrated in a lower half part of FIG. 3, the additional information $\underline{A}$ is printed on an embedding area $\underline{S}$ having a predetermined size on the paper P. In the case of an example illustrated in FIG. 3, four kinds of pieces of the additional information A1 to A4 are disposed in blocks B obtained by dividing the embedding area $\underline{S}$. The pieces of the additional information A1 to A4 are disposed in a plurality of blocks respectively corresponding to the pieces of the additional information A1 to A4 by being dispersed. The pieces of the additional information A1 to A4 are respectively given to the generations of copies of the original (e.g., a child copy of the original is a second generation copy, and a grandchild copy of the original is a third generation copy).

Although an example of disposing the four kinds of addition information A1 to A4 in a plurality of blocks is illustrated, the number of kinds of additional information is not limited to 4. The disposition of a plurality of blocks in which the pieces of the additional information A1 to A4 respectively corresponding to the generations of copies may be either predetermined or randomly determined. It is preferable for enhancing a recognition rate that the blocks, in which the pieces of the additional information A1 to A4 are disposed, are dispersed over the entire paper P.

Next, an image processing program according to the present embodiment is described below. The image processing program according to the present embodiment is executed mainly in a CPU 10 of the image processing apparatus. A process of embedding the additional information is performed in the additional information processing portion. In a case where a personal computer is applied to the image processing apparatus according to the present invention, the image processing apparatus is implemented mainly as a device driver. In any case, the image processing program according to the present embodiment is provided by being stored in a predetermined medium (e.g., a CD-ROM, and a DVD-ROM). Alternatively, image processing program according to the present embodiment is installed in the apparatus through a predetermined medium. The program itself is an object to be distributed through a network.

Figure 4:
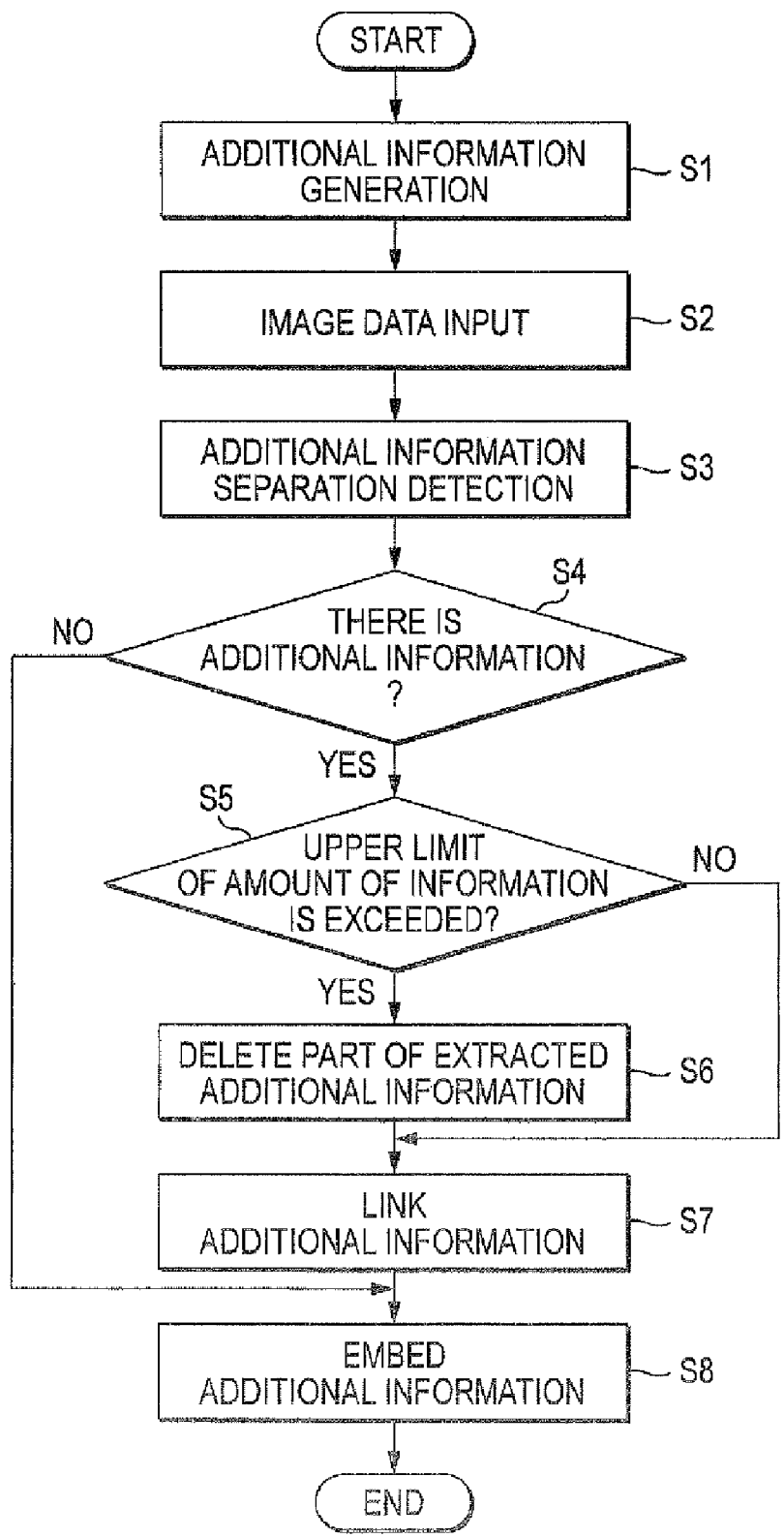
FIG. 4 is a flowchart illustrating an image processing program according to the embodiment of the invention.

FIG. 4 is a flowchart illustrating an additional information embedding process to be performed by executing the image processing program according to the present embodiment. In the following description, reference numerals, which are not shown in FIG. 4, are referred to in FIGS. 1, 2 and 3.

First, when image processing, such as copying of an original, is started, the additional information generating portion 41 generates additional information to be embedded, in step S1. The additional information is registered as history information corresponding to the image processing. Also, image data read from the image reading portion 2 is input to the additional information processing portion 4 in step S2.

In the additional information processing portion 4, the additional information extracting portion 42 processes the received image data and extracts the additional information already embedded in the read image data in step S3. The read image data includes user's original data (representing characters, photographs, graphics or the like) together with the additional information. An example of a method of separating a user's original data from the additional information is to separate the original data utilizing character recognition or pattern recognition.

Subsequently, it is determined in step S4 whether the additional information is extracted. If no additional information is embedded in the image data (No in step S4), the additional image embedding portion 44 embeds the additional information generated by the additional information generating portion 41 in the image data. Then, the additional image embedding portion 44 passes output data to the image output portion 8.

Meanwhile, if the additional information is embedded in the image data (Yes in step S4), the additional information constructing portion 43 calculates a total sum of an amount of the extracted additional information and an amount of additional information newly generated by the addition information generating portion 41, and determines in step S5 whether the total sum exceeds an upper limit of the amount of embeddable information. That is, the additional information constructing portion 43 determines whether both the extracted additional information and the generated additional information can be disposed in the embedding area S of the paper P as shown in the lower half part of FIG. 3.

Illustrative examples of determination conditions are the presence/absence of an empty block B, in which additional information can be embedded, in the embedding area S (i.e., whether the embedding area reaches an upper limit of the size of an area in which the additional information can be embedded), and the data size of the information which can be embedded (whether the embedding area reaches an upper limit of an amount of embeddable information). The larger the amount of the information to be embedded becomes, the processing load of the extraction of the additional information and the embedding of the additional information increases. Consequently, there is a fear of reduction in the performance of primary image processing. Thus, the upper limit of the amount of information to be embedded can be changed according to the performance of the image processing apparatus.

If it is determined that the embedding area does not exceed the upper limit of the amount of the embeddable information (No in step S5), the additional information constructing portion 43 links the extracted additional information with the additional information generated by the additional information generating portion 41 in step S7. Then, the additional information constructing portion 43 passes new additional information, which is obtained by linking, to the additional information embedding portion 44. Subsequently, the additional information embedding portion 44 embeds the new additional information received from the additional information constructing portion 43 in the image data in step S8. Then, the additional information embedding portion 44 passes output data to the image output portion 8.

Meanwhile, if it is determined in step S5 that the embedding area exceeds the upper limit of the amount of the embeddable information (Yes in step S5), the additional information constructing portion 43 deletes a part of the extracted additional information in step S6 to assure an area in which the new additional information generated by the additional information generating portion 41.

More specifically, the following methods can be considered. That is, according to a first method, among pieces of the extracted additional information, the additional information constructing portion 43 deletes the additional information, the embedding time-and-date of which is oldest, and links the remaining pieces of the extracted additional information with the additional information generated by the additional information generating portion 41. Alternatively, according to a second method, the additional information constructing portion 43 deletes the second oldest additional information, instead of the first oldest additional information, and links the remaining pieces of the extracted additional information with the additional information generated by the additional information generating portion 41. Information representing which of the pieces of the additional information is deleted can be stored in a nonvolatile memory so that the additional information to be deleted is selected according to the security policy of a site that operates the image processing apparatus.

Although the linking of the additional information is performed unconditionally in the above methods, a step of linkage exception determination processing can be added thereto so as to prevent occurrence of wasteful overwriting and linking of the additional information. Thus, the above methods can be adapted so that in a case where an exception condition is met, the linking is not performed. There are the following examples of the exception condition.

(1) The image processing, such as copying, is performed in the same unit (determination is performed according to the machine number of the image processing apparatus).

(2) The image processing is performed within a predetermined time period (i.e., a preset time period in which copying can be performed (determination is performed according to the time-and-date at which the copying is performed)).

(3) The image processing is performed by the same user (determination is performed according to the user ID).

Next, an example of the additional information embedding pattern is described below. As illustrated in FIG. 3, the embedding area S provided in a printing area of the paper P is divided into plural blocks B. The pieces of the additional information can be embedded thereinto independent of one another in units of the blocks B. In the following description of the embedding pattern, the case of setting an area, in which the pieces of the additional information respectively corresponding to three generations of image-processing (i.e., three kinds of additional information) are embedded, is described by way of example. However, the embedding pattern according to the invention is not limited thereto.

(Pattern 1)

Figure 5:
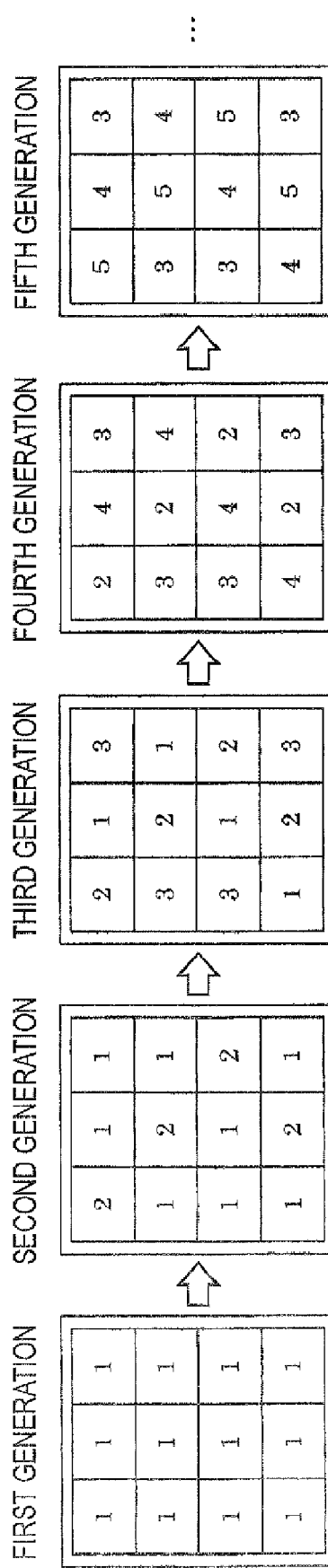
FIG. 5 is a schematic diagram illustrating additional information embedding pattern 1.

FIG. 5 is a schematic diagram illustrating an additional information embedding pattern 1. Numerals shown in FIG. 5 designate pieces of additional information (actually, barcodes) respectively corresponding to the generations of image-processing. First, in a case where image processing is performed on an original document, additional information "1" (corresponding to a first generation) concerning the first image processing is embedded in all the blocks.

Subsequently, in a case where the image processing is performed on a first generation document again, the additional information "1" embedded in each of optional ones of the blocks is deleted. Then, additional information "2" corresponding to a second generation is newly embedded therein. Incidentally, the optional ones of the blocks are the plural arranged blocks in which the pieces of the additional information corresponding to the same generation are embedded. The arrangement of the optional ones of the blocks can be either predetermined or randomly determined. In any event, preferably, the blocks, in which the pieces of the additional information corresponding to the second generation are embedded, are dispersed as much as possible.

Next, in a case where the image processing is performed on a second generation document again, the additional information "1" embedded in each of optional ones of the blocks other than the blocks, in each of which the additional information "2" is embedded, is deleted. Then, additional information "3" corresponding to a third generation is newly embedded therein.

Next, in a case where the image processing is performed on a third generation document again, the pieces of the additional information "1" to "3" respectively corresponding to the first to third generations have already been embedded in the blocks. Thus, there is no space in which the additional information corresponding to a fourth generation. Consequently, in the case of embedding the pieces of the additional information respectively corresponding to fourth and subsequent generations, the additional information, whose embedding time-and-date is oldest (i.e., corresponding to the oldest generation), is deleted among the pieces of the additional information already embedded. Then, the pieces of the additional information corresponding to the new generation are embedded in the blocks from which the additional information has been deleted.

More specifically, when the pieces of additional information "4" corresponding to the fourth generation are embedded, the pieces of the additional information "1" corresponding to the oldest generation, that is, the first generation among the precedent three generations are deleted. Then, the pieces of the additional information "4" are embedded in the blocks from which the pieces of the additional information are deleted.

An embedding process to be subsequently performed is similar to the above embedding process. For example, in the case of the pieces of additional information "5" corresponding to a fifth generation, the pieces of the additional information "2" corresponding to the oldest generation among the precedent three generations are deleted. Then, the pieces of the additional information "5" corresponding to the fifth generation are embedded therein. According to such an embedding pattern, the pieces of the additional information respectively corresponding to the latest three generations are always left in the area.

(Pattern 2)

Figure 6:
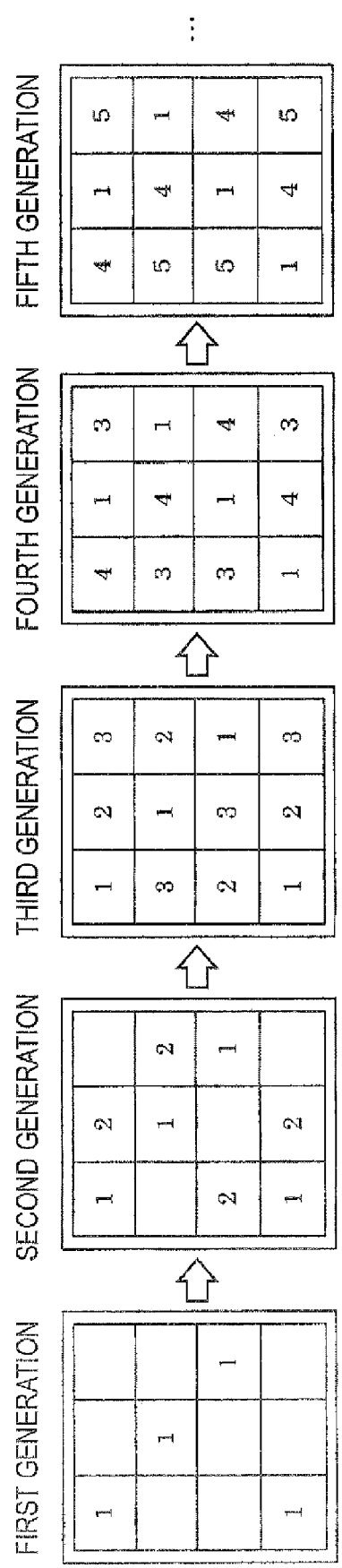
FIG. 6 is a schematic diagram illustrating additional information embedding pattern 2.

FIG. 6 is a schematic diagram illustrating an additional information embedding pattern 2. Numerals shown in FIG. 6 designate pieces of additional information (actually, barcodes) respectively corresponding to the generations of image-processing, similarly to those shown in FIG. 5. First, in a case where image processing is performed on an original document, additional information "1" (corresponding to a first generation) concerning the first image processing is embedded in some of the blocks. Preferably, the blocks, in which the pieces of the additional information are embedded, are dispersed as much as possible, for a reason similar to that for dispersing the blocks in the case of employing the first pattern 1.

Next, in a case where image processing is performed on a first-generation document again, the pieces of the additional information "2" corresponding to the second generation are newly embedded in optional empty blocks. Subsequently, in a case where image processing is performed on a second-generation document again, the pieces of the additional information "3" corresponding to the third generation are embedded in optional empty blocks. In the case of this example, the pieces of the additional information "3" corresponding to the third generation are embedded in all the remaining empty blocks.

Next, in a case where image processing is performed on a third-generation document again, the pieces of the additional information "1" to "3" respectively corresponding to the three generations are already embedded. Therefore, there is no space, in which the pieces of the additional information "4" corresponding to the next generation are embedded. Then, in a case where the pieces of the additional information respectively corresponding to fourth and subsequent generations are embedded, the pieces of the additional information, whose embedding time-and-date is the second oldest, are deleted, among the pieces of the additional information corresponding to plural generations having already been embedded. Then, the pieces of the additional information respectively corresponding to the new generations are embedded in the blocks from the pieces of the additional information, whose embedding time-and-date is the second oldest, are deleted.

More specifically, when the pieces of the additional information "4" corresponding to the fourth generation are embedded, the pieces of the additional information corresponding to the second oldest generation among the precedent three generations are deleted from the corresponding blocks. Then, the pieces of the additional information "4" are embedded in these blocks.

An embedding process to be subsequently performed is similar to the above embedding process. For example, in the case of the pieces of additional information "5" corresponding to a fifth generation, the pieces of the additional information "3" corresponding to the second oldest generation among the precedent three generations are deleted. Then, the pieces of the additional information "5" corresponding to the fifth generation are embedded therein. According to such an embedding pattern, the pieces of the additional information "1" corresponding to the oldest generation, that is, the first generation and the pieces of the additional information respectively corresponding to the latest tow generations are always left in the area.

The additional information embedding patterns according to the invention are not limited to the above two patterns. Various other embedding patterns can be employed. Additionally, the number of the kinds of the additional information to be embedded, the number of the blocks, the resolution at which image processing is performed, and the setting of the embedding area can appropriately be set.

Also, the case of copying the original has been mainly described in the description of the present embodiment by way of example. However, for example, the invention can be applied to a case where the image information representing the image of the original read by the image reading portion 2 is output by facsimile communication through a predetermined circuit. For example, it is useful to perform the following process. That is, when the image of the original, which is an object of facsimile communication, is read by the image reading portion 2, in a case where the pieces of the additional information have already been embedded in the area, the pieces of the additional information have already been embedded are extracted. Then, the extracted pieces of the additional information are linked with the pieces of the additional information newly generated when performing the facsimile connection. Subsequently, the pieces of resultant additional information are embedded therein. Then, the image information is transmitted by performing facsimile communication.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
   an image reader that reads image information;
   a generator that generates unique additional information to be added to the image information read by the image reader;
   an extractor that extracts, in a case where existing additional information has been included in the image information read by the image reader, the existing additional information; and
   an additional information processor that embeds the existing additional information and the unique additional information in the image information,
   wherein in a case where a plurality of pieces of the existing additional information extracted by the extractor exists, and where an area in which they are embedded reaches a predetermined upper limit, the additional information processor deletes the second oldest or subsequent one among the extracted existing additional information, and processes to embed the unique additional information generated by the generator into an area in which the deleted existing additional information has been embedded.

2. A tangible computer readable medium storing a program causing a computer to execute a process for performing an image processing, the process comprising:
   reading image information;
   generating new additional information to be added to the read image information;
   extracting additional information which has already been included in the read image information;
   embedding the extracted additional information and the generated additional information into the image information; and
   in a case where a plurality of pieces of the additional information extracted from the image information exist, and where an area in which they are embedded reaches a predetermined upper limit, deleting the second oldest or subsequent one among the extracted additional information, and embedding the generated additional information into an area in which the deleted additional information has been embedded.

3. A tangible computer readable medium storing a program causing a computer to execute a process for performing an image processing, the process comprising:
   reading image information;
   generating new additional information to be added to the read image information;
   extracting additional information which has already been included in the read image information;
   embedding the extracted additional information and the generated additional information into the image information; and
   in a case where a plurality of pieces of the additional information extracted from the image information exist, and where an area in which they are embedded reaches a predetermined upper limit, deleting the oldest one among the extracted additional information, and embedding the generated additional information into an area in which the deleted additional information has been embedded.

4. A tangible computer readable medium storing a program causing a computer to execute a process for performing an image processing, the process comprising:
   reading image information;
   generating new additional information to be added to the read image information;
   extracting additional information which has already been included in the read image information;
   embedding the extracted additional information and the generated additional information in the read image information; and
   in a ease where a plurality of pieces of the additional information extracted from the image information exist, and where an area in which they are embedded reaches a predetermined upper limit, deleting the second oldest one among the extracted additional information, and embedding the generated additional information into an area in which the deleted additional information has been embedded.

5. The image processing apparatus as claimed in claim 1, where the predetermined upper limit is a size of an area in which the unique additional information can be embedded.

6. The image processing apparatus as claimed in claim 1, wherein the predetermined upper limit is an amount of information in which the unique additional information can be embedded.

* * * * *